United States Patent [19]

Verde et al.

[11] 4,096,320

[45] Jun. 20, 1978

[54] PROCESS FOR THE PREPARATION OF BUTYL RUBBER

[75] Inventors: Luigi Verde, Busto Arsizio (Varese); Roberto Riccardi, San L. di Parabiago (Milan), both of Italy

[73] Assignee: Societa' Italiana Resine S.I.R. S.p.A., Milan, Italy

[21] Appl. No.: 737,874

[22] Filed: Nov. 1, 1976

[30] Foreign Application Priority Data

Oct. 30, 1975 Italy ............................. 28803 A/75

[51] Int. Cl.² ............................................. C08F 2/04
[52] U.S. Cl. ...................................... 526/72; 526/88; 526/339
[58] Field of Search .......................... 526/339, 88, 72; 260/95 R

[56] References Cited

U.S. PATENT DOCUMENTS

| | | | |
|---|---|---|---|
| 2,491,710 | 12/1949 | Calfee | 526/72 |
| 2,844,569 | 7/1958 | Green | 526/72 |

*Primary Examiner*—Paul R. Michl
*Attorney, Agent, or Firm*—Sughrue, Rothwell, Mion, Zinn and Macpeak

[57] ABSTRACT

Butyl rubber is prepared by polymerizing isobutylene and a conjugated diolefin in a liquid reaction medium wherein the temperature is controlled by indirect heat-exchange with boiling ethylene admixed with a gas which is inert towards ethylene, the said boiling ethylene being subjected to a controlled pressure maintained at a value not lower than atmospheric.

2 Claims, 1 Drawing Figure

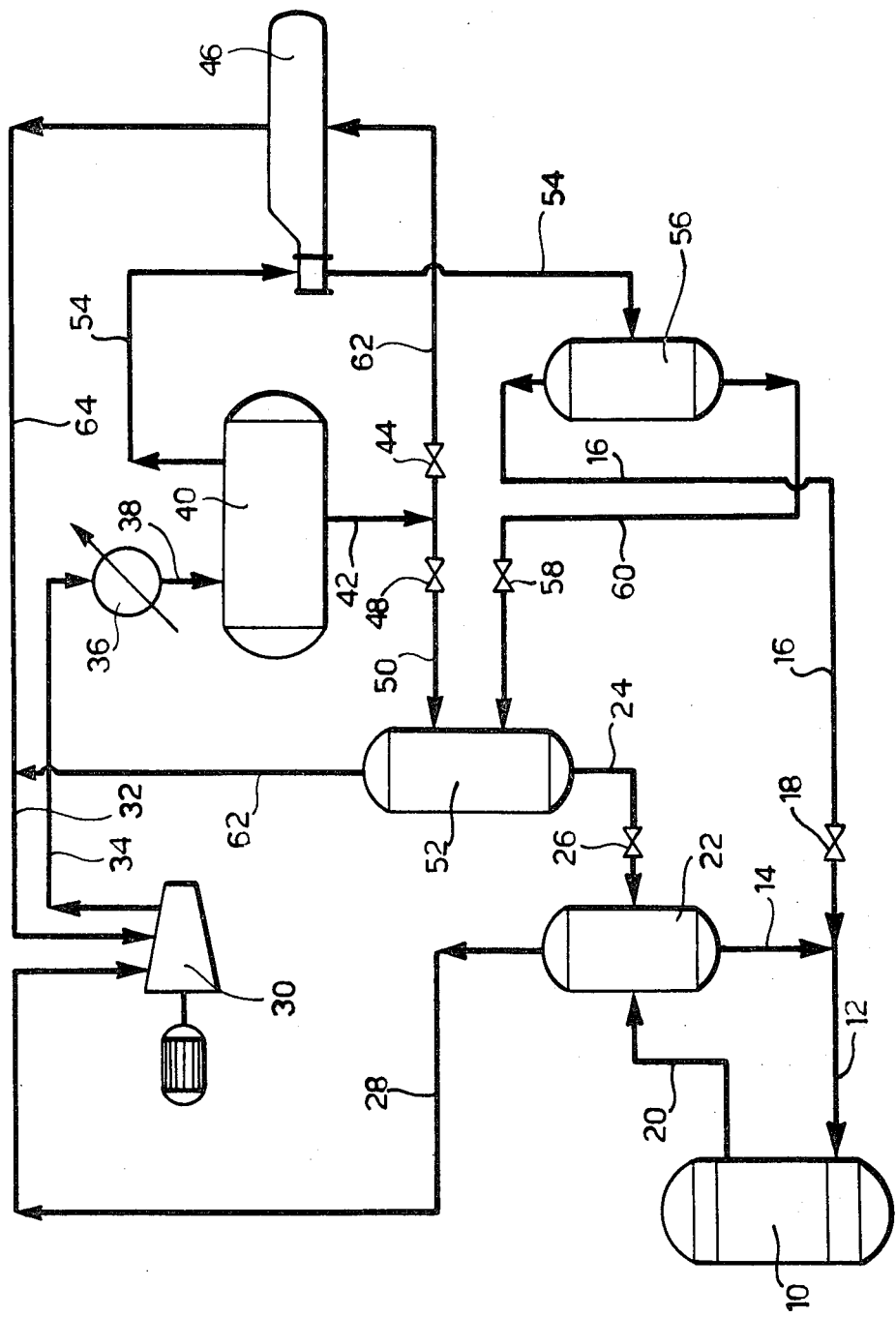

PROCESS FOR THE PREPARATION OF BUTYL RUBBER

The present invention relates to improvements in the process for preparing butyl rubber.

As is known, butyl rubber is commercially prepared by contacting, under polymerization conditions, a major amount of isobutylene and a minor amount of a conjugated diolefin.

More particularly, operation is carried out in a liquid diluent consisting of methyl chloride or another halo derivative of a lower alkane, in the presence of a Friedel-Crafts catalyst, at a temperature of from about $-85°$ to about $-115°$ C.

The low temperatures required for the polymerization are generally obtained, according to the known art, by evaporating ethylene in coolers located within the polymerization reactor.

Evaporation of ethylene at atmospheric pressure does not allow the temperature to be lowered below about $-104°$ C. This value proves to be insufficient in many cases for a suitable cooling of the reaction medium, since polymerization temperatures lower than the above indicated value are often required in the preparation of butyl rubber.

Therefore, according to the known art, ethylene is evaporated at subatmospheric pressure, thus rendering complex the polymerization apparatus.

These drawbacks are overcome by means of the process of the present invention, according to which butyl rubber is polymerized in a liquid reaction medium, cooled by indirect heat exchange with boiling ethylene, without operating in any point of the cooling circuit below atmospheric pressure.

Thus, the invention provides a process for the preparation of butyl rubber, wherein a mixture of isobutylene and one or more conjugated diolefins is polymerized in a liquid diluent consisting of a hologenated aliphatic hydrocarbon, in the presence of a Friedel-Crafts catalyst dissolved in said liquid diluent, and wherein the reaction temperature is controlled by indirect heat exchange with boiling ethylene subjected to a controlled pressure, characterized by the steps of dissolving in, or admixing with the ethylene used as heat-absorbent a gas which is inert towards ethylene, and maintaining said pressure at a value not lower than atmospheric.

The mixture to be polymerized generally comprises a major amount of isobutylene and a minor amount of a conjugated diolefin chosen from those having from 4 to 8 carbon atoms per molecule. The diolefins particularly useful for the purpose are isoprene, butadiene, piperylene and alphamethylpentadiene. Particularly satisfactory results are obtained by copolymerizing isobutylene and isoprene in a molar ratio of the order of 97:3.

The liquid diluent is generally a halo derivative of an alkane containing one or two carbon atoms per molecule, and preferably methyl chloride.

The said diluent is generally used in an amount of from 1 to 10 volumes, and preferably from 2 to 5 volumes for each volume of reagents.

The polymerization catalyst is chosen from Friedel-Crafts catalysts, such as for example aluminium trichloride and boron trifluoride. The catalyst is generally present in an amount of from 0.1 to 1.5% by weight with respect to the reaction mixture.

During the polymerization, the monomer conversion is generally maintained at a value of from 60 90%, for the purpose of producing butyl rubber having suitable values of the molecular weight.

Polymerization is generally carried out at a temperature of from $-85°$ to $-115°$ C, and ethylene is generally boiled at atmospheric pressure or at a pressure slightly higher than atmospheric (typically 1–1.2 atmospheres).

The gas dissolved in, or admixed with ethylene is preferably nitrogen, hydrogen or methane. The amount of said gas depends on the cooling temperature which one wishes to obtain. Generally, said amount of inert gas is from 2 to 15 moles for each 100 moles of ethylene.

In this manner it is possible to obtain cooling temperatures as low as $-112°$ C, when ethylene is boiled at pressures of 1–1.2 atmospheres.

In a preferred embodiment, hydrogen is used as inert gas in an amount of the order of 5–6 moles for each 100 moles of ethylene.

Concluding, the function of the pre-selected inert gas is to reduce the partial pressure of ethylene, the total pressure being left unchanged, thus reducing accordingly the boiling temperature of ethylene.

The process of the present invention will now be more fully described, by way of example only, with reference to the accompanying drawing which illustrates an apparatus for carrying out an embodiment of the invention. In the following description, the parts and percentages are intended by weight unless otherwise specified.

With reference to the drawing, the polymerization reactor (10) is continuously fed with a mixture comprising 23% of isobutylene, 2% of isoprene and 75% of methyl chloride. The reactor is also fed with aluminium trichloride dissolved in methyl chloride.

Polymerization is carried out in reactor 10 at a temperature of about $-100°$ C, maintaining a conversion of the order of 80% with respect to the monomer feed. Butyl rubber is produced at a rate of 120 parts per hour, said butyl rubber being continuously discharged together with the other constituents of the reaction medium.

Reactor 10 is provided with an internal cooler which is fed through pipe 12 with a mixture of ethylene and hydrogen, delivered at a rate of 569 and 2.3 parts per hour, respectively, at a temperature of $-110.5°$ C and at a pressure of 1.1 atmospheres.

The stream of pipe 12 is obtained by combining the stream of pipe 14, consisting of 547 parts of liquid ethylene at the temperature of $-101°$ C and at the pressure of 1.1 atmospheres, with the stream of pipe 16 consisting of 22 parts of gaseous ethylene and 2.3 parts of hydrogen at the temperature of $-65°$ C and at the pressure of 18.5 atmospheres. Stream 16 is expanded through valve 18 down to a pressure of 1.1 atmospheres, before being combined with stream 14. The liquid ethylene present in stream 12 is vaporized in the cooler of reactor 10 within the temperature range of from $-110.5°$ to $-103°$ C, and a gaseous mixture containing ethylene and hydrogen is discharged through pipe 20 at a temperature of $-103°$ C and at a pressure of 1.1 atmospheres. Stream 20 is delivered to container 22 which is also fed with stream 24 consisting of 641 parts of liquid ethylene at the temperature of $-71.5°$ C and at the pressure of 5.1 atmospheres, said stream 24 being previously expanded through valve 26 down to a pressure of 1.1 atmospheres.

A gaseous stream consisting of 663 parts of ethylene and 2.3 parts of hydrogen is discharged from container 22 through pipe 28 at the temperature of −102.5° C and at the pressure of 1.1 atmospheres.

Stream 28 is delivered to compressor 30 which is also fed with stream 32 consisting of a gaseous mixture of 337 parts of ethylene and 0.28 parts of hydrogen at the temperature of −71.5° C and at the pressure of 5.1 atmospheres.

The gaseous stream issuing from compressor 30 through pipe 34, at the temperature of 100° C and at the pressure of 21 atmospheres, is cooled in propylene cooler 36 down to a temperature of −38° C, and then delivered to container 40 through pipe 38.

A liquid stream consisting of 814 parts of ethylene and 0.18 parts of hydrogen is discharged from container 40 at the temperature of −38° C and the pressure of 19.5 atmospheres.

A fraction of said stream 42 is delivered to exchanger 46 and a fraction to phase-separator 52.

The fraction delivered through pipe 62 to exchanger 46, upon expansion through valve 44 down to a pressure of 5.1 atmospheres, is evaporated to condense a fraction of the ethylene present in the gaseous stream flowing through pipe 54, thus reducing in stream 16 the amount of ethylene vapour with respect to the inert gas and consequently the recompression costs.

The remaining fraction of stream 42 is expanded through valve 48 down to a pressure of 5.1 atmospheres and delivered to container 52 through pipe 50.

The vapours issuing from container 52 through pipe 62 as well as those issuing from exchanger 46 through pipe 64 constitute stream 32 which is recycled to compressor 30 by suction.

A gaseous stream consisting of 186 parts of ethylene and 2.40 parts of hydrogen is discharged from container 40 through pipe 54 at the temperature of −38° C and at the pressure of 19.5 atmospheres.

This stream 54 is delivered to container 56, upon heat exchanger in 46 to condense a fraction of the ethylene present in said stream.

In addition to the gaseous stream 16, a liquid stream 60 consisting of 164 parts of ethylene and 0.1 parts of hydrogen, is discharged from container 56. Upon expansion through valve 58, said stream 60 is at a temperature of −71° C and at a pressure of 5.1 atmospheres.

This stream 60 is delivered to container 52 from which are discharged the liquid stream 24 and the gaseous stream 62 consisting of 127 parts of ethylene and 0.24 parts of hydrogen at the temperature of −71.5° C and at a pressure of 5.1 atmospheres.

What we claim is:

1. In a process for the preparation of butyl rubber, wherein a mxture of isobutylene and one or more conjugated diolefins is polymerized in a liquid diluent consisting of a halogenated aliphatic hydrocarbon, in the presence of a Friedel-Crafts catalyst dissolved in said liquid diluent, and where the reaction temperature is controlled by indirect heat exchange with boiling ethylene subjected to a controlled pressure, the improvement which comprises the steps of dissolving in, or admixing with the ethylene used as heat-absorbent, a gas which is inert towards ethylene, and maintaining said pressure at a value not lower than atmospheric, wherein said gas inert towards ethylene is nitrogen, and said nitrogen is admixed, or dissolved in the ethylene in an amount of 2 to 15 moles for each 100 mols of said ethylene 2. In a process for the preparation of butyl rubber, wherein a mixture of isobutylene and one or more conjugated diolefins is polymerized in a liquid diluent consisting of a halogenated aliphatic hydrocarbon, in the presence of a Friedel-Crafts catalyst dissolved in said liquid diluent, and wherein the reaction temperature is controlled by indirect heat exchange with boiling ethylene subjected to a controlled pressure, the improvement which comprises the steps of dissolving in, or admixing with the ethylene used as heat-absorbent, a gas which is inert towards ethylene, and maintaining said pressure at a value not lower than atmospheric, wherein said gas inert towards ethylene is hydrogen, and said hydrogen is admixed, or dissolved in the ethylene in an amount of 2 to 15 moles for each 100 mols of said ethylene.

* * * * *